(12) United States Patent
Matsubara

(10) Patent No.: US 8,726,932 B2
(45) Date of Patent: May 20, 2014

(54) PIPE CONNECTOR

(75) Inventor: Satoshi Matsubara, Kasukabe (JP)

(73) Assignee: Sanoh Kogyo Kabushiki Kaisha, Tokyo-To (JP)

( * ) Notice: Subject to any disclaimer, the term of this patent is extended or adjusted under 35 U.S.C. 154(b) by 173 days.

(21) Appl. No.: 12/542,868

(22) Filed: Aug. 18, 2009

(65) Prior Publication Data

US 2010/0044609 A1    Feb. 25, 2010

(30) Foreign Application Priority Data

Aug. 22, 2008 (JP) ................................. 2008-214089

(51) Int. Cl.
*F16K 15/00* (2006.01)

(52) U.S. Cl.
USPC ....................... 137/515.5; 137/542; 137/513.3

(58) Field of Classification Search
USPC .............. 137/542, 515, 540, 538, 535, 513.3, 137/515.5, 528
See application file for complete search history.

(56) References Cited

U.S. PATENT DOCUMENTS

| | | | | |
|---|---|---|---|---|
| 3,794,077 A | * | 2/1974 | Fanshier | 137/513.3 |
| 4,936,339 A | * | 6/1990 | Bennett | 137/454.6 |
| 5,148,828 A | * | 9/1992 | Farnham | 137/454.6 |
| 5,174,327 A | * | 12/1992 | Truax et al. | 137/469 |
| 5,392,805 A | * | 2/1995 | Chrysler | 137/218 |
| 6,802,491 B1 | * | 10/2004 | Kelly et al. | 251/149.6 |
| 7,222,637 B2 | * | 5/2007 | Miyajima | 137/515.5 |
| 2006/0021659 A1 | * | 2/2006 | Andersson | 137/515 |
| 2007/0044848 A1 | * | 3/2007 | Norman | 137/542 |

FOREIGN PATENT DOCUMENTS

| | | |
|---|---|---|
| JP | H06-300150 | 10/1994 |
| JP | 10-103581 A | 4/1998 |
| JP | H10-103581 | 4/1998 |
| JP | 2002-168384 | 6/2002 |
| JP | 2003-15844 A | 1/2003 |
| JP | 2003-028010 | 1/2003 |
| JP | 2003105844 A * | 4/2003 |
| JP | 2004-116733 | 4/2004 |
| JP | 2004-116733 A | 4/2004 |
| JP | 2005-163836 | 6/2005 |

OTHER PUBLICATIONS

Machine Translation of JP 2003105844A.*
Patent abstracts of Japan English abstract of JP 2003-15844 A.
Patent Abstract of JP 2002-168384 dated Jun. 14, 2002.
Patent Abstract of JP 2003-028010 dated Jan. 29, 2003.
Patent Abstract of JP 2005-163836 dated Jun. 23, 2005.

(Continued)

*Primary Examiner* — John K Fristoe, Jr
*Assistant Examiner* — Jessica Cahill
(74) *Attorney, Agent, or Firm* — Ladas & Parry LLP

(57) ABSTRACT

A pipe connector is provided with a valve cartridge. The pipe connector can be modified so as to meet requirements for a variety of uses without changing the basic design of the connector body by simply replacing the valve cartridge with another valve cartridge having valve functions meeting a desired use. The pipe connector includes a tubular connector body 10 through which a fluid flows, and a valve cartridge 30 capable of being fitted in the connector body and of controlling the flow of the fluid.

7 Claims, 3 Drawing Sheets

(56) References Cited

OTHER PUBLICATIONS

Patent English Abstract of Japanese H10-103581 Published Apr. 21, 1998.
Patent English Abstract of Japanese H06-300150 Published Oct. 28, 1994.
Patent English Abstract of Japanese 2004-116733 Published Apr. 15, 2004.
Japanese Office Action Issued on Sep. 14, 2012 With English Translation.
Interrogatory issued on Nov. 22, 2013 for Japanese Application No. 2010-287514 (Trial No. 2013-15277) with English translation.
espacenet English abstract of JP 2004-116733 A dated Nov. 12, 2013.
espacenet English abstract of JP 10-103581 A dated Nov. 12, 2013.

* cited by examiner

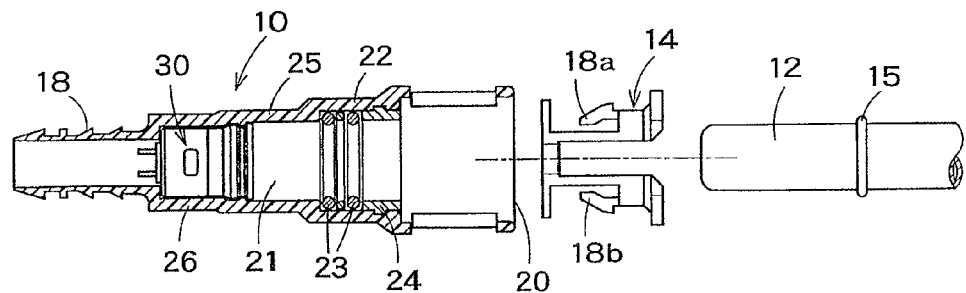
F I G. 1
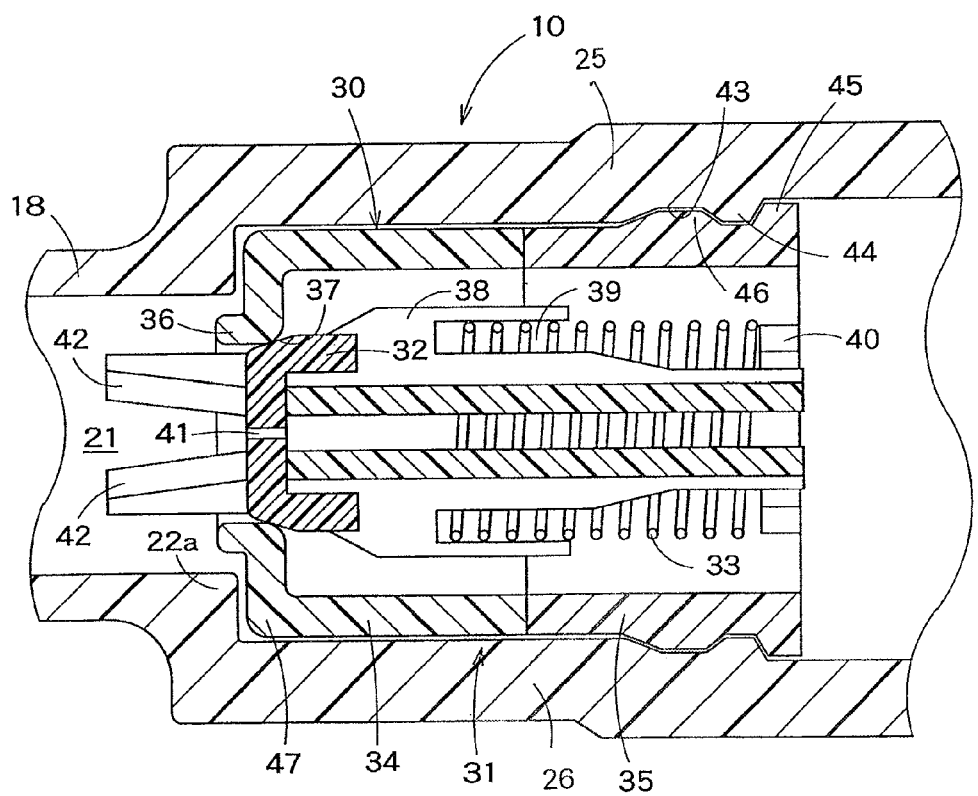
F I G. 2

PIPE CONNECTOR

BACKGROUND OF THE INVENTION

1. Field of the Invention

The present invention relates to a pipe connector having a tubular body for carrying a fluid and a valve mechanism placed in the tubular body and, more particularly, to a pipe connector provided with a valve cartridge.

2. Description of the Related Art

Some pipe connectors are provided with a built-in valve mechanism. A pipe connector disclosed in JP-A 2002-168385 or JP-A 2003-028010 has a connector body and a valve mechanism built into the connector body. In this pipe connector, a valve seat having a valve opening is formed inside the connector body. A valve element is seated on the valve seat and a compression coil spring presses the valve element against the valve seat.

When the pressure of a fluid flowing through this pipe connector provided with the built-in valve mechanism increases, the fluid separates the valve element from the valve seat against the resilience of the compression coil spring to open the valve opening. The flow rate of the fluid flowing through the pipe connector is dependent on the spring characteristic of the compression coil spring. Therefore, this valve mechanism fails in the stable control of the flow rate when the spring characteristic changes with time.

A pipe connector provided with a built-in valve mechanism proposed in JP-A 2005-163836 to solve the foregoing problem is provided with a flow regulating orifice in addition to a valve opening opened and closed by a valve element pressed by a compression coil spring. The flow regulating orifice removes the influence of the characteristic of the compression coil spring on flow rate.

The valve mechanism built into the known pipe connector includes the valve seat formed in the connector body, and the valve element as essential elements. Therefore, the shape of the connector body necessarily needs to be changed to change the functional characteristics of the valve mechanism. Thus, the functional characteristics of the valve mechanism cannot be easily changed.

When the shape of the connector body is changed, the surface of the valve seat, the valve element and the compression coil spring need to be adjusted carefully and ascertained such that the valve element is lifted up by a predetermined pressure and a predetermined flow rate can be stably maintained.

Therefore, the functional valve parts need to be examined in combination with the connector body. Thus, the manufacture of pipe connectors provided with a valve mechanism for different uses and having different characteristics requires much time and labor, which increases the cost of the pipe connectors.

SUMMARY OF THE INVENTION

Accordingly, it is an object of the present invention to solve problems in the prior art and to provide a pipe connector having a connector body and a replaceable valve cartridge having desired valve functions and combined with the connector body. The replaceable valve cartridge can be replaced with another one capable of exercising valve functions meeting intended use. The valve functions of the pipe connector can be changed by selectively combining a valve cartridge having desired valve functions with the same connector body. Thus, the same connector body can be used for forming a pipe connector having desired valve functions.

Another object of the present invention is to provide a pipe connector having a connector body and a valve cartridge whose valve functions can be tested before combining the valve cartridge with the connector body.

The present invention provides a pipe connector including: a tubular connector body through which a fluid flows; and a valve cartridge capable of being fitted in the connector body and of controlling the flow of the fluid; wherein the valve cartridge includes a valve element for opening and closing a flow passage, a coil spring for pressing the valve element, a case provided with a valve seat defining a valve opening and holding the valve element and the coil spring therein.

In the pipe connector according to the present invention, the case of the valve cartridge includes a first case provided with the valve seat, and a second case holding the coil spring therein.

In the pipe connector according to the present invention, the second case has an end part in which an end part of a pipe is fitted.

In the pipe connector according to the present invention, the valve element of the valve cartridge is provided with an orifice that allows the fluid to flow at a low flow rate.

In the pipe connector according to the present invention, the connector body is provided in its inside surface with a first interlocking par, and the case of the valve cartridge is provided in its outside surface with a second interlocking part capable of interlocking with the first interlocking part of the connector body.

In the pipe connector according to the present invention, the first interlocking part has a first annular groove and a first annular ridge, and the second interlocking part has a second annular ridge capable of engaging in the first annular groove and a second annular groove capable of engaging with the first annular ridge.

In the pipe connector according to the present invention, the case of the valve cartridge includes a first case provided with the valve seat, and a second case holding the coil spring therein, the connector body is provided in its inside surface with a first interlocking part, and the second case of the case is provided in its outside surface with a second interlocking part capable of interlocking with the first interlocking part.

In the pipe connector according to the present invention, the case of the valve cartridge is formed in a shape so that the case of the valve cartridge can be inserted into the connector body either in a forward direction or a backward direction.

The pipe connector of the present invention is a quick connector having the connector body and the valve cartridge fitted in the connector body.

The connector body of pipe connector of the present invention is provided at its opposite ends with connecting parts to be pressed in pipes, respectively.

In the pipe connector according to the present invention, the valve cartridge has valve functions independent of the type, shape and construction of the pipe connector.

A valve cartridge according to the present invention capable of being fitted in a tubular connector body through which a fluid flows and of controlling the flow of the fluid includes; a valve element for opening and closing f flow passage; a coil spring for pressing the valve element; and a cartridge case provided with a valve seat defining a valve opening, and holding the valve element and the coil spring therein.

According to the present invention, a pipe connector can be modified so as to meet requirements for a variety of uses without changing the basic design of the connector body by simply replacing the valve cartridge with another valve cartridge having valve functions meeting a desired use.

BRIEF DESCRIPTION OF THE DRAWINGS

FIG. 1 is a longitudinal sectional view of a pipe connector in a first embodiment according to the present invention;

FIG. 2 is a longitudinal sectional view of an essential part of the pipe connector shown in FIG. 1;

DESCRIPTION OF THE PREFERRED EMBODIMENTS

First Embodiment

Figure 3:
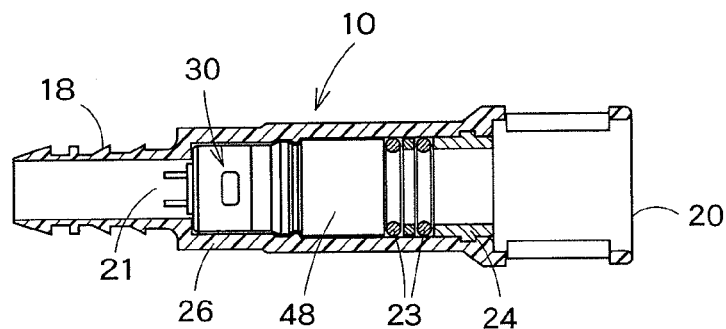
FIG. 3 is a longitudinal sectional view of a pipe connector in a second embodiment according to the present invention.

Referring to FIG. 1 showing a pipe connector in a first embodiment according to the present invention in a longitudinal sectional view, there are shown a connector body 10, a pipe 12 to be connected to the connector body 10, and a retainer 14 for retaining the pipe 12 in the connector body.

The pipe connector in the first embodiment is a quick connector.

The pipe 12 is made of a metal or a resin. The pipe 12 is provided on its outside surface with an annular ridge at a predetermined distance from its free end.

The retainer 14 is fitted through an inlet 20 in the connector body 10. When an end part of the pipe 12 is inserted into the retainer 14, the retainer holds the pipe 12 in the connector body 10. Thus, the pipe 12 can be coupled with the connector body 10 by simply pressing the pipe 12 into the retainer 14.

The retainer 14 is a plastic member having an inside diameter approximately equal to the outside diameter of the pipe 12. The retainer 14 is integrally provided with locking fingers 18a and 18b. The locking fingers 18a and 18b engage with the annular ridge 15 of the pipe 12 when the pipe 12 is inserted into the retainer 14.

The connector body 10 is a female coupler into which the pipe 12 is inserted. The connector body 10 is integrally provided with a press-in connecting part 18 to be pressed in a resin pipe. The connector body 10 defines an axial flow passage 21. The connector body 10 has four cylindrical parts respectively having different inside diameters, namely, a first cylindrical part 22, a second cylindrical part 25, a third cylindrical part 26 and the corrugated press-in connecting part 18. O rings 23 are fitted in the first cylindrical part 20 having a big diameter and is retained in place by an O ring retainer 24. The second cylindrical part 25 receives an end part of the pipe 12. The third cylindrical part 26 holds a valve cartridge 30.

As shown in FIG. 1, the valve cartridge 30 capable of controlling flow rate is fitted in the connector body 10. The valve cartridge 30 can be removed from the connector body 10. The valve cartridge 30 exercises valve functions independent of the shape and construction of the connector body 10.

Referring to FIG. 2, the valve cartridge 30 includes a case 31, a valve element 32 and a coil spring 33. The case 31 is divided into two cylindrical cases, namely, a first case 34 and a second case 35. The first case 34 is provided with a valve seat 36 having a contact surface 37 and defining a valve opening.

The valve element 32 is seated on the valve seat 36 in close contact with the contact surface 37. The valve element 32 is held on a head end of a cylindrical member 38. An annular groove 39 of a predetermined depth is formed in a tail end of the cylindrical member 38. A head end part of a coil spring 33 is received in the annular groove 39 of the cylindrical member 38. The second case 35 is provided with a spring seat 40. The tail end of the coil spring 33 is seated on the spring seat 40. As shown in FIG. 2, the coil spring 33 is compressed between the cylindrical member 38 and the spring seat 40 to press the valve element 32 resiliently against the contact surface 37 of the valve seat 37.

In a state shown in FIG. 2, the flow passage 21 is closed. However, since the valve element 32 is provided with an orifice 41, it allows the fluid to flow at a predetermined flow rate through the valve element 32.

As shown in FIG. 2, valve guides 42 formed integrally with the valve element 32 extends axially through the valve opening defined by the valve seat 36. The valve guide 42 ensures the smooth movement of the valve 32 and maintains the valve element 32 is a correct position.

A fixing mechanism for fixedly holding the valve cartridge 30 in the connector body 10 will be described. Referring to FIG. 2, the second cylindrical part is provided in its inside surface with an annular groove 43 and a shoulder 44. The second case 35 of the valve cartridge 30 is provided on its outside surface with an annular ridge 46 that engages in the annular groove 43, and a flange 45 that engages with the shoulder 44. The valve seat 36 is formed in an end wall 47 of the first case 34 of the valve cartridge 30. The end wall 47 of the first case 34 comes into contact with a shoulder 22a formed in the second cylindrical part 22 of the connector body 10 to position the valve cartridge 30 in the connector body 10. Thus, the valve cartridge 30 can be positioned and held in the connector body 10 simply by pressing the valve cartridge 30 into the connector body 10.

The valve cartridge 30 is made by assembling the case 31, the valve element 32 and the coil spring 33. Thus, the valve cartridge can be assembled and tested independently of the connector body 10.

The case 31 is divided into the cylindrical first case 34 and the cylindrical second case 35. The valve seat 36, which exercises important valve functions in combination with the valve element 32, is formed in the first case 34. The second case 35, which exercises mechanical functions, is used for compressing the coil spring 33. Thus, the first case 34 and the second case 35 can be individually manufactured so as to meet characteristics required of the first case 34 and the second case 35.

The valve cartridge 30 is inserted into the connector body 10. The annular ridge 46 formed on the outside surface of the second case 35 of the valve cartridge 30 engages in the annular groove 43 formed in the inside surface of the second cylindrical part of the connector body 10, and the flange 45 of the second case 35 of the valve cartridge 30 engages with the shoulder 44 formed in the inside surface of the second cylindrical part of the connector body 10 when the valve cartridge 30 is pressed into the connector body 10. Thus the valve cartridge 30 can be incorporated into the connector body 10 simply be pressing the valve cartridge 30 into the connector body 10. The case 31 is divided into the cylindrical first case 34 and the cylindrical second case 35. The annular ridge 46 that engages in the annular groove 43 and the flange 45 that engages with the shoulder 44 are formed in the second case 35 to use the second case 35 mainly for dynamically fixing the valve cartridge 30 in the connector body 30. Thus, the first case 34 provided with the valve seat 36 does not need to have a function for dynamically fixing the valve cartridge 30 in the connector body 10.

The pipe connector with a built-in valve includes the connector body 10 and the valve cartridge 30. Pipe connectors having different desired valve functions can be formed by combining valve cartridges having different desired valve functions with connector bodies of the same design, respectively. Thus, the design of the connector body 10 does not need to be changed in providing a pipe connector with a built-in valve having desired valve functions.

Operations and effects of the pipe connector in the first embodiment will be described. The following valve functions are imparted to the pipe connector in the first embodiment by incorporating the valve cartridge 30 into the connector body 10. Since the valve element 32 is provided with the orifice 41, the fluid is allowed to flow at a low flow rate through the pipe connector in a state where the valve element 32 is seated on the valve seat 36 by the resilience of the coil spring 33.

When the pressure of the fluid flowing through the flow passage 21 rises, the pressure of the fluid tries to lift the valve element 32 from the valve seat 36 against the resilience of the coil spring 33. Upon the increase of the pressure of the fluid beyond a predetermined pressure, the valve element 32 is separated from the contact surface 37 of the valve seat 36 and the fluid starts flowing through the gap between the valve element 32 and the contact surface 37 of the valve seat 36 at a flow rate higher than that of the fluid flowing through the orifice 41.

The valve cartridge 30 of the pipe connector in the first embodiment has a valve function for adjusting the flow rate of the fluid to either of two levels, namely, the low flow rate and the high flow rate. The valve functions of the valve cartridge 30 are not dependent at all on the shape and construction of the connector body 10. Therefore, the valve cartridge 30 has the following advantages.

Many functionally different valve cartridges 30 respectively provided with coil springs respectively having different spring constants and orifices 41 respectively having different diameters and respectively conforming to required control characteristics are prepared for use in combination with a connector body 10. One valve cartridge 30 having a desired valve function among the functionally different valve cartridges 30 is used in combination with the connector body 10 to provide a pipe connector having a desired working characteristic.

Pipe connectors having different shapes can be easily made by combining the valve cartridge 30 with connector bodies 10 respectively having different shapes. The pipe connector in the first embodiment is formed by combining the straight connector body 10 and the valve cartridge 30. Pipe connectors respectively having a valve function and various shapes can be made by combining the valve cartridge 30 with, for example, elbows and tees, namely, pipe fittings.

The performance of the valve cartridge 30 can be tested before combining the valve cartridge 30 with the connector body 10 and hence the pipe connector provided with the valve cartridge does not need to be tested. Consequently, fraction defective can be reduced.

Second Embodiment

Figure 4:
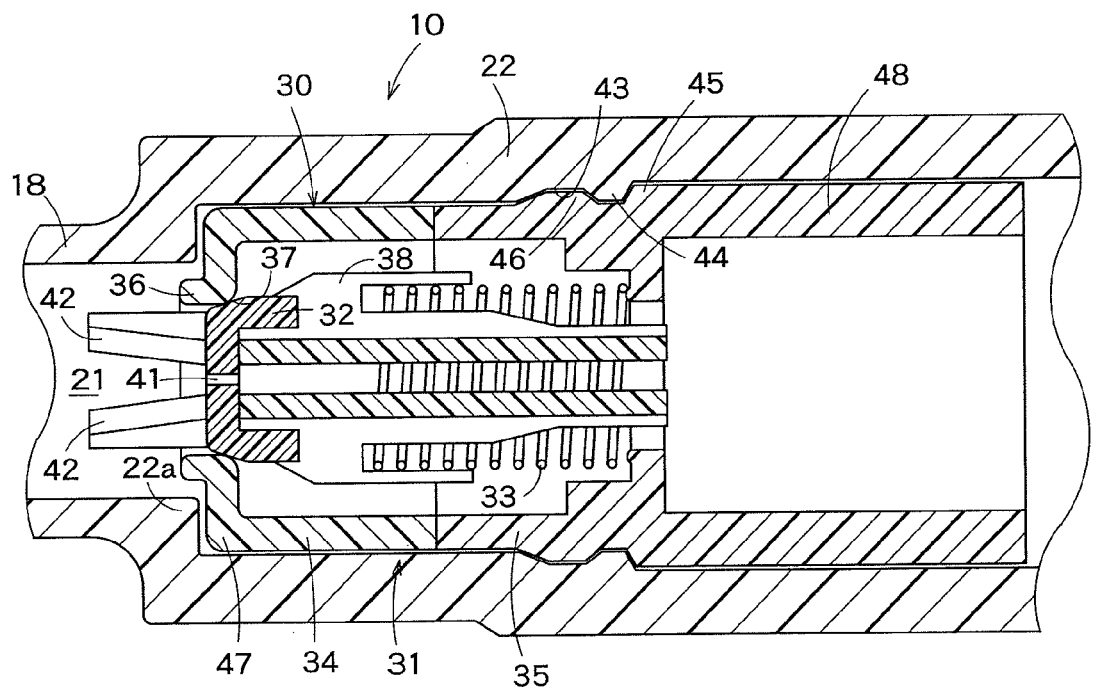
FIG. 4 is a longitudinal sectional view of an essential part of the pipe connector shown in FIG. 3.

A pipe connector in a second embodiment according to the present invention will be described with reference to FIGS. 3 and 4.

The pipe connector in the second embodiment, similarly to the pipe connector in the first embodiment, can withstand high pressures. The pipe connector in the second embodiment is a large pipe connector provided with a large valve cartridge. Since the basic components of the pipe connector in the second embodiment are the same as those of the pipe connector in the first embodiment, the same components are designated by the same reference characters and the description thereof will be omitted.

A pipe holding part 48 is formed integrally with a second case 35 of a case of the valve cartridge. An end part of a pipe 12 is received in the pipe holding part 48 of the second case 35. In the second embodiment, the pipe holding part 48 for receiving the end part of the pipe 12, which is formed normally in a connector body 10, is formed integrally with the second case 35 of the valve cartridge 30. Therefore, the dimensional augmentation of the functional parts of the valve cartridge 30 can be absorbed by the second case 35, which increases the degree of freedom of design of the functional parts of the valve cartridge 30. Since the valve cartridge 30 undertakes some of the functions of the pipe connector, details of the pipe connector can be easily adjusted.

Third Embodiment

A pipe connector in a third embodiment according to the present invention will be described with reference to FIGS. 5 and 6.

Figure 5:
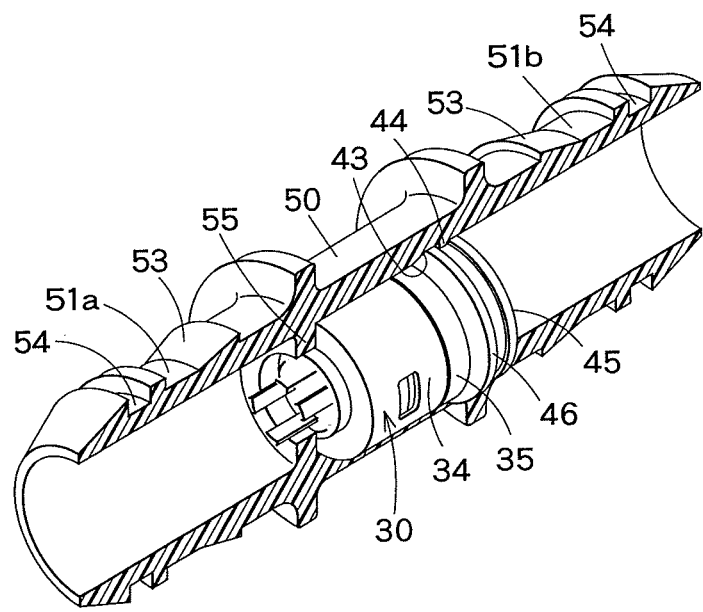
FIG. 5 is a perspective view of a pipe connector in a third embodiment according to the present invention.
Figure 6:
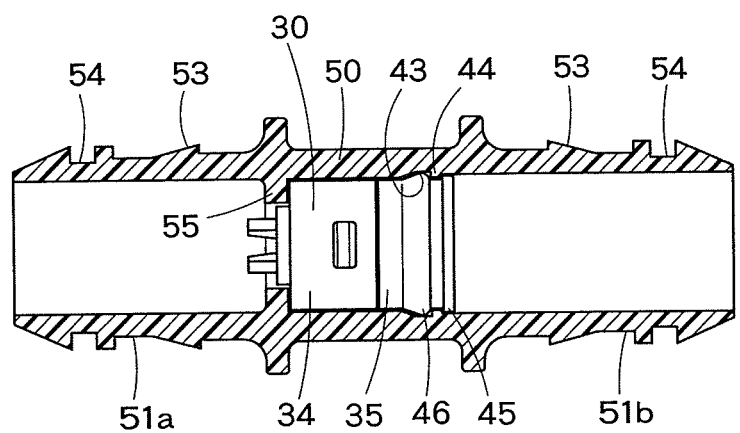
FIG. 6 is a longitudinal sectional view of the pipe connector shown in FIG. 1.

The pipe connector in the third embodiment is formed by combining the valve cartridge 30 of the first embodiment into a pipe connector shown in FIGS. 5 and 6. Therefore the description of the valve cartridge 30 will be omitted.

A connector body 50 included in the pipe connector has press-in connecting parts 51a and 51b extending in opposite directions from the opposite ends of the connector body 50, respectively. The connecting parts 51a and 51b are pressed into resin pipes, respectively. The connecting parts 51a and 51b are provided with stopping ridges 53 for preventing the separation of the resin pipes connected to the connecting parts 51a and 51b. O rings are engaged in annular grooves 54 formed in the connecting parts 51a and 51b.

A valve positioning ring 55 protrudes from the inside surface of a connector body 50. An annular groove 43 and a shoulder 44 are formed in the inside surface of the connector body 50. A second case 35 of the valve cartridge 30 is provided on its outside surface with an annular ridge 46 that engages in the annular groove 43, and a flange 45 that engages with the shoulder 44. A fixing structure that fixes the valve cartridge 30 in a connector body 50 is similar to that of the first embodiment.

The valve cartridge 30 can be incorporated not only into the connector bodies 10 to form the pipe connectors in the first and the second embodiment, namely, quick connectors, but also into the connector body 50 having the connecting parts 51a and 51b to be pressed in the resin pipes, respectively, to form the pipe connector in the third embodiment. The pipe connector in the third embodiment is formed by combining the straight connector body 50 and the valve cartridge 30. Pipe connectors respectively having a valve function and various shapes can be made by combining the valve cartridge 30 with, for example, elbows and tees, namely, pipe fittings.

Although the preferred embodiments of the present invention have been described, the present invention is not limited thereto in its practical application. For example, the case of the valve cartridge may be formed in a shape such that makes it possible for the valve cartridge to be inserted into the connector body either in a forward direction or in a backward direction. Although the valve cartridge 30 is fitted in the connector body 10 with the valve element 32 disposed on the left side in the first embodiment shown in FIG. 2, the annular groove 43 and the shoulder 44 of the second cylindrical part 22 of the connector body 10 and the annular ridge 46 formed on the outside surface of the second case 35 of the valve cartridge 30 and the flange 45 of the second case 35 may be shaped and positioned such that the valve cartridge 30 can be fitted in the connector body 10 with the valve element 32 disposed on the right side as viewed in FIG. 2.

What is claimed is:

1. A pipe connector comprising:
a tubular connector body through which a fluid flows; and
a valve cartridge capable of being fitted in the connector body and of controlling the flow of the fluid,
wherein the valve cartridge includes:
a valve element for opening and closing a flow passage;
a coil spring for pressing the valve element; and
a case provided with a valve seat defining a valve opening and holding the valve element and the coil spring therein;
the connector body has a first cylindrical shape and is provided on its inside cylindrically shaped surface with a first interlocking part that is positioned along an inner circumference of the connector body, and
the case of the valve cartridge has a second cylindrical shape and is provided on its outside radial cylindrically shaped surface with a second interlocking part that is positioned along an outer circumference of the case of the valve cartridge, capable of interlocking with the first interlocking part,
the first interlocking part and the second interlocking part are interlocked with each other along the inner circumference of the connector body and the outer circumference of the case of the valve cartridge when the valve cartridge is pushed in a direction of an axis of the connector body into the connector body; and
the first interlocking part has a first annular groove or a first annular ridge formed on the inside cylindrically shaped surface, and the second interlocking part has a second annular ridge capable of engaging with the first annular groove or a second annular groove capable of engaging with the first annular ridge formed on the outside cylindrically shaped surface, in order that the first interlocking part and the second interlocking part are able to fit each other in both a radial direction and an axial direction,
wherein the case of the valve cartridge includes a first case part provided with the valve seat, and a second case part provided with a spring seat for making a tail end of the coil spring set on the spring seat and the second interlocking part, the coil spring being held in the case and the coil spring pressing the valve element to the valve seat through the spring seat;
wherein the valve element of the valve cartridge is provided with an orifice that allows the fluid to flow at a low flow rate.

2. The pipe connector according to claim 1, wherein the second case part has an end part in which an end part of a pipe is fitted.

3. The pipe connector according to claim 1, wherein the first interlocking part has a first shoulder neighboring the first annular groove or a first flange neighboring the first annular ridge, and the second interlocking part has a second flange neighboring the second annular ridge and capable of engaging with the first shoulder or a second flange neighboring the second annular groove and capable of engaging with the first shoulder.

4. The pipe connector according to claim 1, wherein the second case part is provided with the second interlocking part on its outside cylindrically shaped surface.

5. The pipe connector according to claim 1, wherein the case of the valve cartridge is formed in a shape so that the case of the valve cartridge can be inserted into the connector body either in a forward direction or a backward direction.

6. The pipe connector according to claim 1, wherein the connector body is provided at its opposite ends with connecting parts to be pressed in pipes, respectively.

7. A valve cartridge capable of being fitted in a tubular connector body through which a fluid flows and of controlling the flow of the fluid, said valve cartridge comprising:
a valve element for opening and closing flow passage;
a coil spring for pressing the valve element; and
a cartridge case provided with a valve seat defining a valve opening, and holding the valve element and the coil spring therein,
wherein the connector body has a first cylindrical shape and is provided on its inside cylindrically shaped surface with a first interlocking part, that is positioned along an inner circumference of the connector body, and
the case of the valve cartridge has a second cylindrical shape and is provided on its outside cylindrically shaped surface with a second interlocking part that is positioned along an outer circumference of the case of the valve cartridge, capable of interlocking with the first interlocking part,
the first interlocking part and the second interlocking part are interlocked with each other along the inner circumference of the connector body and the outer circumference of the case of the valve cartridge when the valve cartridge is pushed in a direction of an axis of the connector body into the connector body in order that the first interlocking part and the second interlocking part are able to fit each other in both a radial direction and an axial direction, and
the first interlocking part has a first annular groove or a first annular ridge formed on the inside cylindrically shaped surface, and the second interlocking part has a second annular ridge capable of engaging with the first annular groove or a second annular groove capable of engaging with the first annular ridge formed on the outside cylindrically shaped surface,
wherein the case of the valve cartridge includes a first case part provided with the valve seat, and a second case part provided with a spring seat for making a tail end of the coil spring set on the spring seat and the second interlocking part, the coil spring being held in the case and the coil spring pressing the valve element to the valve seat through the spring seat;
wherein the valve element of the valve cartridge is provided with an orifice that allows the fluid to flow at a low flow rate.

* * * * *